US007062837B1

(12) United States Patent
Butler

(10) Patent No.: US 7,062,837 B1
(45) Date of Patent: Jun. 20, 2006

(54) METHOD FOR MANUFACTURING A DISK DRIVE WITH A HINGED HEAD DISK ASSEMBLY ENCLOSURE

(75) Inventor: Walter W. Butler, Scotts Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 230 days.

(21) Appl. No.: 10/774,143

(22) Filed: Feb. 5, 2004

Related U.S. Application Data

(62) Division of application No. 09/920,775, filed on Jul. 31, 2001, now Pat. No. 6,693,767.

(51) Int. Cl.
*G11B 5/127* (2006.01)
*H04R 31/00* (2006.01)

(52) U.S. Cl. .............................. 29/603.03; 29/603.04; 264/242; 264/272.11; 264/272.2; 360/97.01; 360/97.02

(58) Field of Classification Search ............. 29/603.03, 29/603.04; 264/242, 272.11, 272.2; 360/97.01, 360/97.02
See application file for complete search history.

(56) References Cited

U.S. PATENT DOCUMENTS 3,737,067 A * 6/1973 Palson ........................ 220/324
4,347,537 A    8/1982 Schoettle et al.
5,587,854 A * 12/1996 Sato et al. ................ 360/97.01
5,880,904 A    3/1999 Mizoshita et al.
6,094,323 A    7/2000 Tong
6,411,434 B1 * 6/2002 Eastman et al. ............ 359/398

FOREIGN PATENT DOCUMENTS

JP           10120065 A  *  5/1998

OTHER PUBLICATIONS

"Laser processing to adjust the suspension preload of magnetic recording head stack assemblies"; Singh, C.P.; Brown, B.R.; Werlich, H.; Kozlovsky, W.; Magnetics, IEEE Transactions on vol. 36, Sep. 2000; pp.:2724-2726.*

* cited by examiner

Primary Examiner—Paul D Kim
(74) Attorney, Agent, or Firm—Hogan & Hartson LLP; Joshua C. Harrison, Esq.

(57) ABSTRACT

A disk drive includes an enclosure that defines an exterior surface, the enclosure including a base, a cover and a hinge mechanically coupling the base to the cover such that the hinge forms a portion of the exterior surface of the enclosure. A spindle motor is attached to the base, a disk is mounted to the spindle motor, and a head stack assembly is pivotally coupled to the base. A method of manufacturing a disk drive includes a single molding step to form an enclosure including the base, the cover and a hinge that mechanically couples the base to the cover such that the hinge forms a portion of the exterior surface of the enclosure. The spindle motor may then be attached to the base, the disk or disks mounted to the spindle motor and the head stack assembly may be pivotally coupled to the base.

5 Claims, 4 Drawing Sheets

FIG. 1 *(Prior Art)*

__METHOD FOR MANUFACTURING A DISK DRIVE WITH A HINGED HEAD DISK ASSEMBLY ENCLOSURE__

This patent application is a divisional application of and claims priority to U.S. patent application Ser. No. 09/920,775 filed on Jul. 31, 2001, now U.S. Pat. No. 6,693,757, the contents of which are incorporated herein by reference.

BACKGROUND OF THE INVENTION

1. Field of the Invention

The present invention relates to disk drives. More particularly, the present invention relates to disk drives having a head disk assembly including an integrated hinge and methods for manufacturing such disk drives.

2. Description of the Prior Art

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a head with at least one transducer for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head toward the disk; and (3) a flex cable assembly that provides an electrical interconnect with minimal constraint on movement.

A typical HGA includes a load beam, a gimbal attached to an end of the load beam, and a head attached to the gimbal. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the head and transmits the gram load biasing force to the head to "load" the head against the disk. A rapidly spinning disk develops a laminar airflow above its surface that lifts the head away from the disk in opposition to the gram load biasing force. The head is said to be "flying" over the disk when in this state.

Within the HDA, the spindle motor rotates the disk or disks, which are the media to and from which the data signals are transmitted via the head on the gimbal attached to the load beam. The transfer rate of the data signals is a function of rotational speed of the spindle motor; the faster the rotational speed, the higher the transfer rate. A spindle motor is essentially an electro-magnetic device in which the electro-magnetic poles of a stator are switched on and off in a given sequence to drive a hub or a shaft in rotation, the hub including a permanent magnetic ring.

FIG. 1 shows the principal components of a magnetic disk drive 100 constructed in accordance with the prior art. With reference to FIG. 1, the disk drive 100 is an Integrated Drive Electronics (IDE) drive comprising a HDA 144 and a PCBA 114. The HDA 144 includes a base 116 and a separate, discrete cover 117 attached to the base 116 that collectively house a disk stack 123 that includes a plurality of magnetic disks (of which only a first disk 111 and a second disk 112 are shown in FIG. 1), a spindle motor 113 attached to the base 116 for rotating the disk stack 123, an HSA 120, and a pivot bearing cartridge 184 (such as a stainless steel pivot bearing cartridge, for example) that rotatably supports the HSA 120 on the base 116. The base 116 is typically attached to the separate cover 117 by means of screws or other discrete fasteners. The spindle motor 113 rotates the disk stack 123 at a constant angular velocity about a spindle motor rotation axis 175. The HSA 120 comprises a swing-type or rotary actuator assembly 130, at least one HGA 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 with a head. The flex cable assembly 180 includes a flex circuit cable and a flex clamp 159. The HSA 120 is pivotally secured to the base 116 via the pivot-bearing cartridge 184 so that the head at the distal end of the HGA 110 may be moved over a recording surface of the disks 111, 112. The pivot-bearing cartridge 184 enables the HSA 120 to pivot about a pivot axis, shown in FIG. 1 at reference numeral 182. The storage capacity of the HDA 111 may be increased by including additional disks in the disk stack 123 and by an HSA 120 having a vertical stack of HGAs 110 supported by multiple actuator arms 160.

Current trends appear to favor ever-smaller drives for use in a wide variety of devices, such as digital cameras, digital video cameras and other audio-visual (AV) equipment and portable computing devices, for example. Concurrently, the highly competitive nature of the disk drive industry and the ever more stringent size constraints are driving disk drive manufacturers to finds ways to minimize costs. Simplifying the manufacturing process is one avenue that disk drive manufacturers are exploring, with the rationale that fewer manufacturing steps lead to a less costly drive. Toward that end, attention has turned to the drive enclosure as one possible candidate for further cost reductions. Indeed, it has been determined that an HDA configuration wherein the enclosure includes a base and a separate, discrete cover attached with screws might not be optimal, with respect to materials, cost and the number of manufacturing steps required to assemble the enclosure.

What are needed, therefore, are alternatives to disk drives having an HDA enclosure that includes separate base and cover. What are also needed are alternative methods of making hard drives that reduce manufacturing steps and cost.

SUMMARY OF THE INVENTION

Accordingly, this invention may be regarded as a disk drive that includes an enclosure defining an exterior surface, the enclosure including a base; a cover; and a hinge mechanically coupling the base to the cover such that the hinge forms a portion of the exterior surface of the enclosure. A spindle motor is attached to the base, a disk is mounted to the spindle motor and a head stack assembly is pivotally coupled to the base.

The base, the cover and the hinge of the enclosure may be unitarily molded to form a single-piece enclosure. The base, the cover and the hinge of the enclosure may be injection molded together. The enclosure, for example, may include or be formed of a plastic material. The plastic material may include or incorporate a non-plastic filler. The non-plastic filler may include a conductive material. The plastic material may include a filler having an electro-magnetic shielding characteristic. At least a portion of the base may include a metal. The base and/or the cover may include a non-plastic material and the hinge may be insert molded onto the base and the cover. The non-plastic material may include a metal. The base may be formed of a metal and the cover and the hinge may be unitarily formed and the unitarily formed cover and hinge may be insert molded onto the base.

The hinge may be formed in a configuration wherein the cover is initially oriented at about 45 degrees relative to the base. The hinge may be formed of a same material as the cover and the base. The hinge may include a hinge bead, the hinge bead being external to an internal space of the disk drive formed when the enclosure is closed. The cover may form a lip over the base when the enclosure is closed.

The present invention, according to one embodiment thereof, is also a method of manufacturing a disk drive, comprising a single molding step to form an enclosure including a base, a cover and a hinge mechanically coupling the base to the cover such that the hinge forms a portion of an exterior surface of the enclosure; attaching a spindle motor to the base; mounting a disk to the spindle motor, and pivotally coupling a head stack assembly pivotally to the base. The molding step may be or include an injection-molding step.

According to another embodiment thereof, the present invention is a method of manufacturing a disk drive, comprising steps of providing a base; providing a cover; molding a hinge onto the base and the cover to mechanically couple the base to the cover such that the hinge forms a portion of an exterior surface of the enclosure; attaching a spindle motor to the base; mounting a disk to the spindle motor, and pivotally coupling a head stack assembly pivotally to the base. The molding step may be or include an insert-molding step.

The foregoing and other features of the invention are described in detail below and set forth in the appended claims.

DESCRIPTION OF THE PREFERRED EMBODIMENTS

Figure 1:
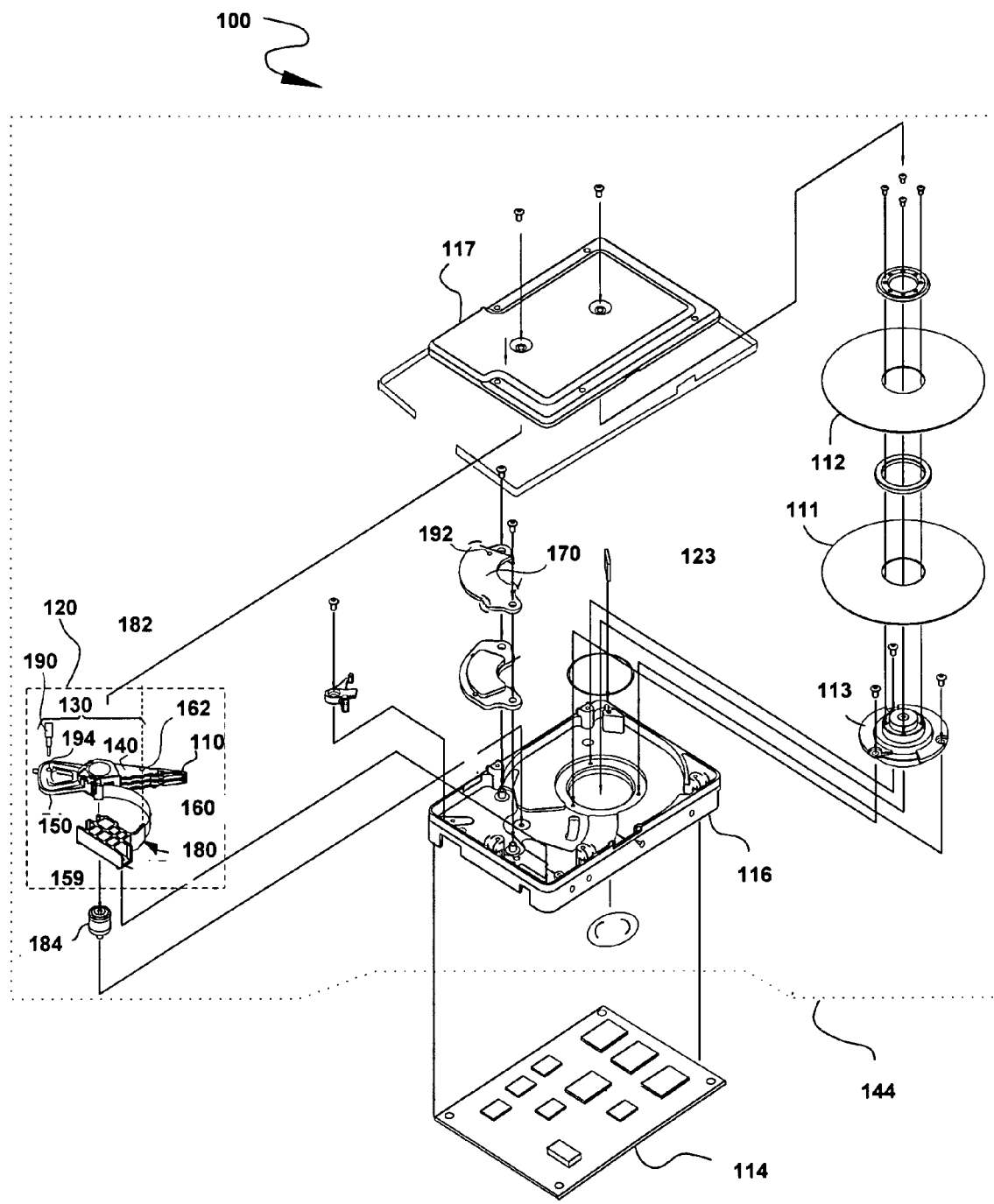
FIG. 1 is an exploded view of a conventional disk drive.
Figure 2:
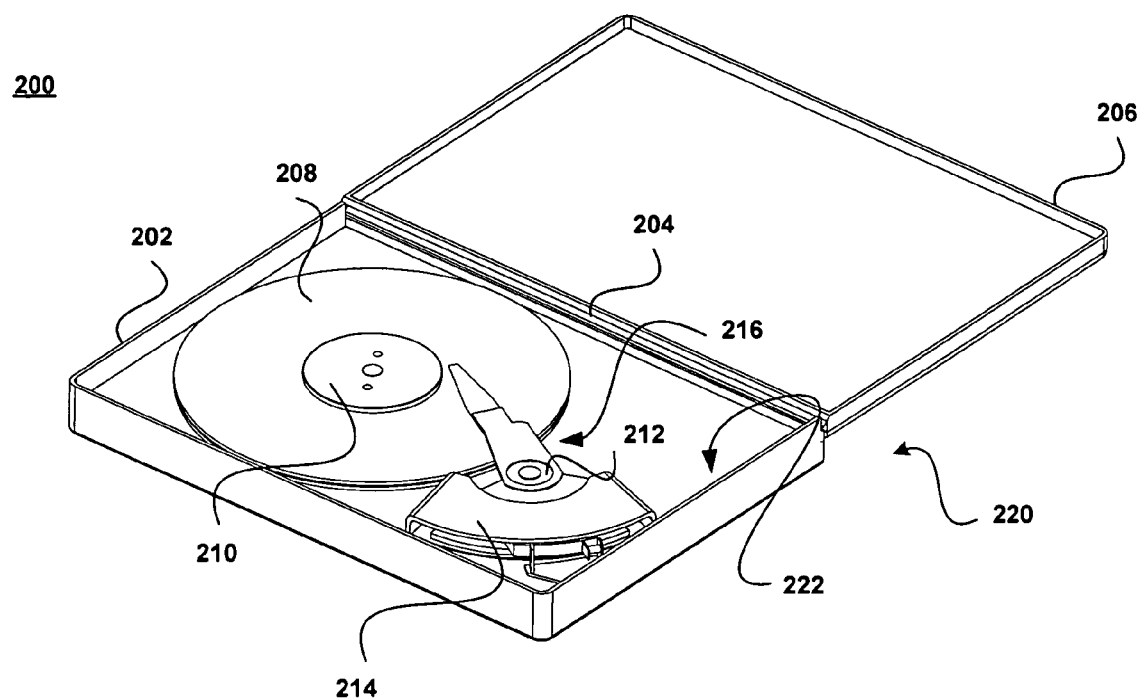
FIG. 2 is a perspective view of a disk drive having a head disk assembly (HDA) enclosure including an integrated hinge, according to the present invention.
Figure 3:
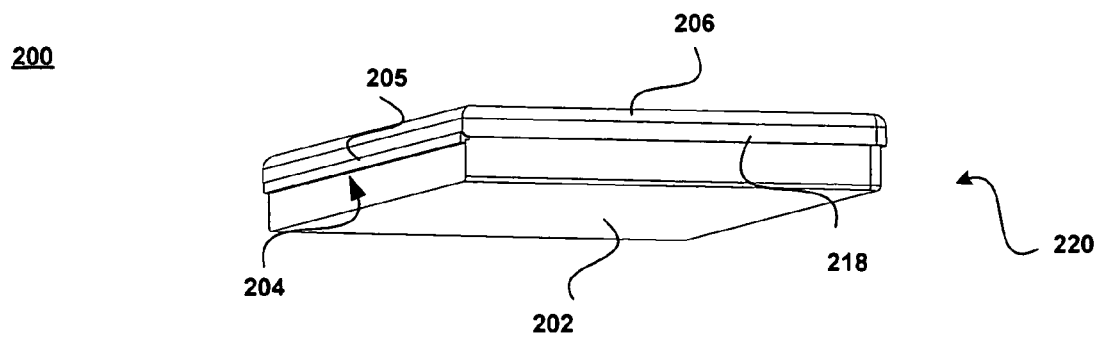
FIG. 3 is a perspective view of the disk drive of FIG. 2 in which the HDA enclosure is in the closed position.

FIG. 2 is a perspective view of a disk drive 200 having a head disk assembly (HDA) enclosure 220 including an integrated hinge 204, according to the present invention. FIG. 3 is a perspective view of the disk drive of FIG. 2 in which the HDA enclosure 220 is in the closed position. Considering now FIGS. 2 and 3 collectively, according to the present invention, the HDA enclosure 220 of the disk drive 200 includes a base 202, an integrated hinge 204 and a cover 206. The hinge 204 mechanically couples the base 202 to the cover 206 such that the hinge 204 forms a portion of the exterior surface of the enclosure 220, as best shown in FIG. 3. As shown in FIG. 2, a spindle motor 210 is attached to the base 202, a disk 208 is mounted to the spindle motor and a head stack assembly 216 is pivotally coupled to the base 202. As those of skill in this art will recognize, although only one such disk 208 is shown in the embodiment illustrated in FIG. 2, it is understood that more than one disk 208 may be mounted to the spindle motor 210. Disk drive 200 further includes a printed circuit board assembly (not shown) suitably attached to base 202.

The enclosure 220 may be manufactured as a single integrated component. That is, rather than individually manufacturing a base, a cover and screws to join the base to the cover, the entire enclosure 220 including the base, cover and hinge may be formed as a single-piece enclosure 220 in a single manufacturing step. The enclosure 220, according to the present invention, has no external screws or fasteners to attach the cover 206 to the base 202. Toward that end, the base, the cover and the hinge of the enclosure 220 may be unitarily molded to form a single-piece enclosure 220 by, for example, an injection molding process.

The enclosure 220 may be formed of or include one or more plastic materials. The enclosure 220 is preferably rigid and preferably has an opening and closing duty cycle of at least five. That is, the integrated hinge 204 is preferably capable of allowing the cover 206 to be opened and closed at least five times without the enclosure 220 losing function or structural integrity. A suitable material for the enclosure 220 (or portions thereof) is a plastic material such as polycarbonate, for example. The hinge 204 may be formed of the same material as the cover 206 and the base 202. Indeed, the enclosure 220 may be formed of or include a single plastic material or may be formed of a dual molding process using two (or more) plastic materials. For example, the base 202 and the cover 206 may be formed of a hard plastic material and the hinge 204 may be formed of or include a relatively more compliant plastic material.

The enclosure 220 preferably also mitigates the effects of interference, of both electromagnetic (EMI) and high frequency (HF) kinds. Accordingly, the plastic material of the enclosure 220 may include a non-plastic filler, to shield the drive 200 against EMI and/or HF interference. Other fillers may be incorporated in the enclosure 220 for other purposes, such as to increase the rigidity of the enclosure 220, for example. According to one embodiment of the present invention, the non-plastic filler may include a conductive material. For example, the base 202 of the enclosure 220 may include or be formed of a plastic material that includes a conductive filler material to render the base 202 conductive. Advantageously, this enables the grounding of the base 202 when mounting the head stack assembly 216 thereon. The plastic material of the enclosure 220 may also include a filler having an electro-magnetic shielding characteristic.

According to further embodiments, at least a portion of the base 202 may include a metal. For example, a metal skeleton structure may be provided, over which the base 202 may be injection molded, optionally together with the cover 206 and/or the hinge 204. Such a metal skeleton structure may advantageously form a conductive grounding plane and increase the structural rigidity of the enclosure 220. According to other embodiments of the present invention, the base 202 and/or the cover 206 may be formed of or include a non-plastic material and the hinge 204 may be insert molded onto the base 202 and/or the cover 206. Such a non-plastic material may include one or more metals. For example, the base 202 may be formed of a metal and the cover 206 and the hinge 204 may be formed as a unitary assembly (i.e., formed as a single component) and the unitarily formed cover 206 and hinge assembly may be insert molded onto the base 202.

Structures such as a lower plate of the VCM 214, the spindle motor 210 and/or the pivot-bearing cartridge 212 of the drive 200 may also be insert molded onto the base 202. Alternatively, a post may be insert molded onto the base 202 to support the pivot-bearing cartridge 212 about which the head stack assembly 216 pivots. Similarly, according to the present invention, the stator portion of the spindle motor 210 may also be insert molded onto the base 202. As those of skill in this art will recognize, a number of other structures may be injection or insert molded onto the base 202 and/or cover 206 of the present HDA enclosure 220. For example, crash stops and/or latches may readily be formed (e.g., injection molded) along with or insert molded into the base 202.

Figure 4:
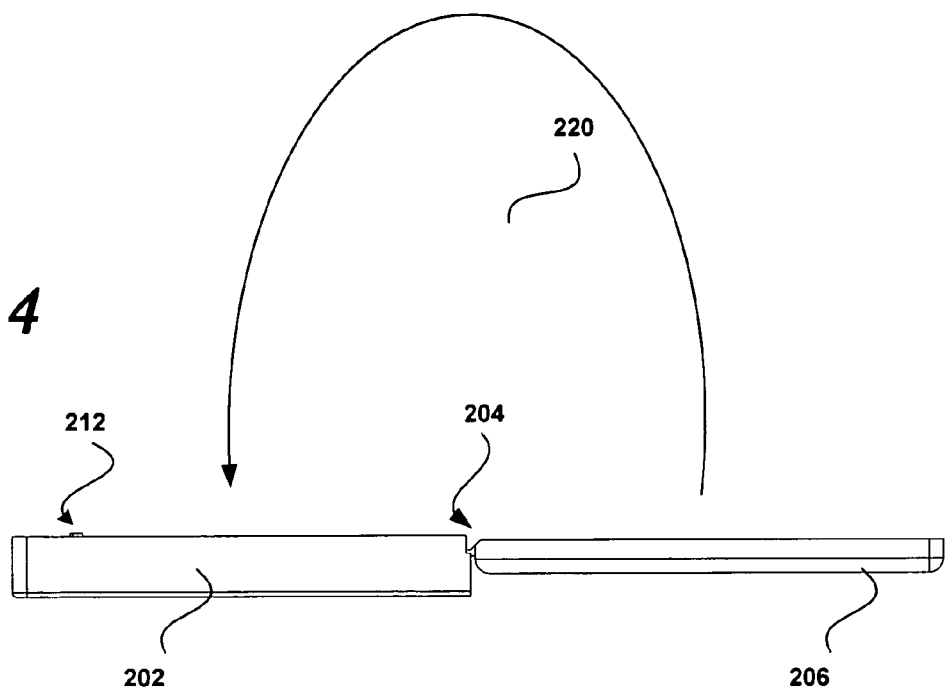
FIG. 4 is a side view of the disk drive of FIG. 2 in which the HDA enclosure is in the open position.
Figure 5:
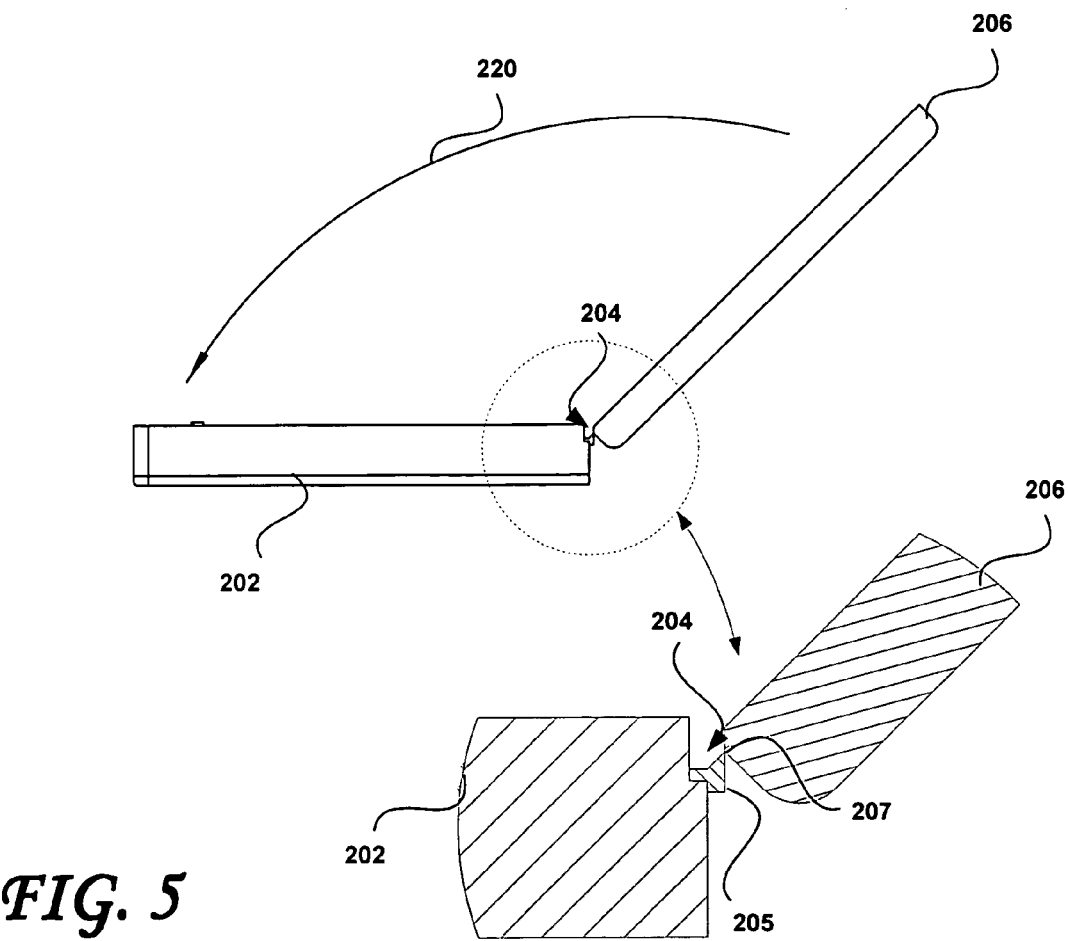
FIG. 5 is a cross-sectional view of the HDA enclosure of the disk drive of FIG. 2, showing a detail view of the bead section of the integrated hinge thereof.
Figure 6:
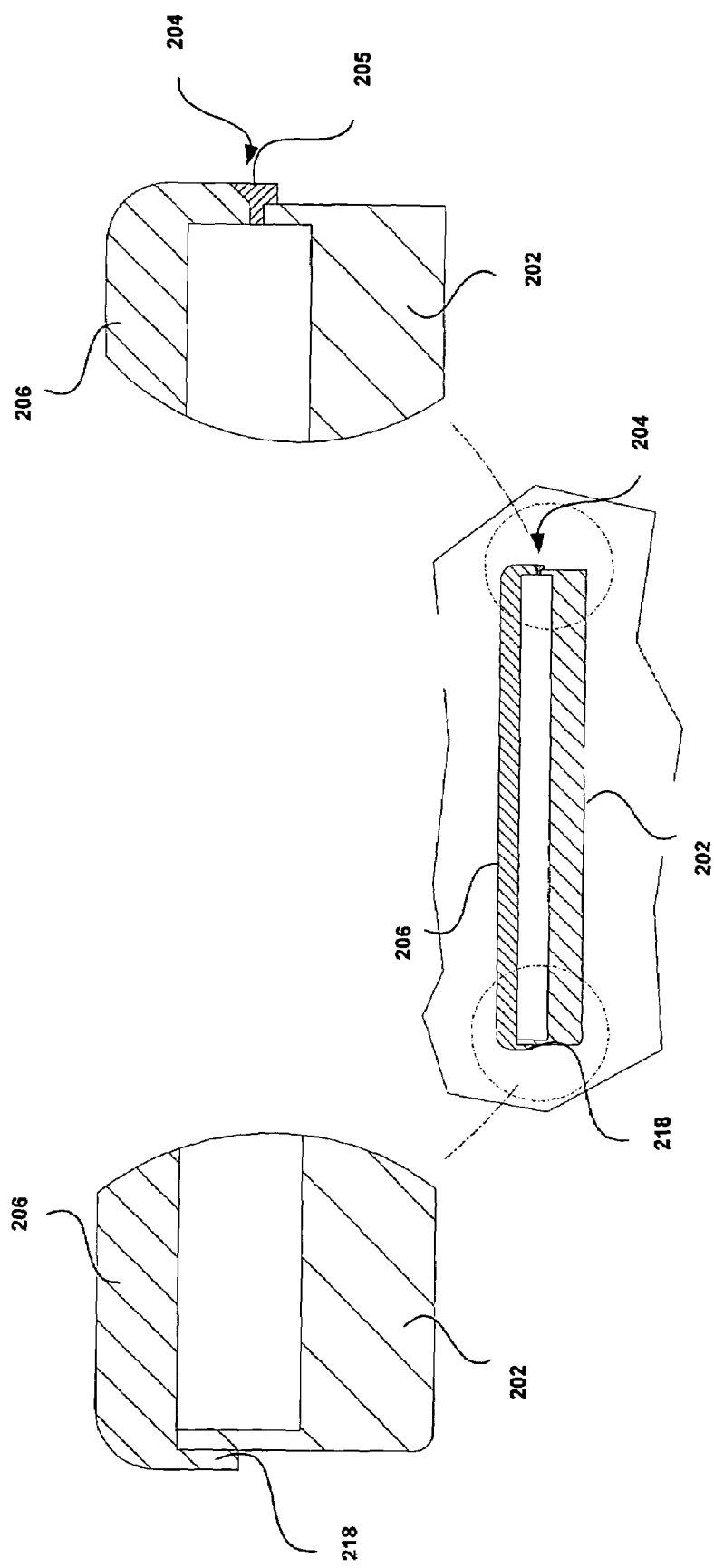
FIG. 6 is a cross-sectional view of the HDA enclosure of the disk drive of FIG. 2, showing detail views of the lip and integrated hinge bead sections thereof.

FIG. 4 is a side view of the disk drive 200 of FIG. 2 in which the HDA enclosure 220 is in the open position. FIG. 5 is a cross-sectional view of the HDA enclosure 220 of the disk drive of FIG. 2 wherein the cover 206 is oriented at a 45-degree angle relative to the vertical, showing a detail view of the bead section of the integrated hinge 204 thereof. As shown therein, the integrated hinge 204 includes a hinge bead 205 and a flexible crease 207. According to an embodiment of the present invention, the hinge bead 205 is external to the enclosure 220 of the disk drive 200. That is, the hinge bead 205 is external to the internal space (shown at 222 in FIG. 2) of the disk drive formed when the enclosure 220 is closed. This configuration is well suited to keeping out particulates that may contaminate the drive 200. As shown in FIG. 5, the enclosure 220 may be molded in a configuration wherein the cover 206 is initially oriented at about 45 degrees relative to the base 202. As shown in FIG. 6, the cover 206 may form a lip 218 over the base 202 when the enclosure 220 is closed.

Advantageously, a single molding step (such as an injection molding step) may form the enclosure 220, including the base 202, the cover 206 and the hinge 204 that mechanically couples the base 202 to the cover 206 such that the hinge 204 forms a portion of the exterior surface of the enclosure 220. To complete the manufacture of a drive 200, the spindle motor 210 may then be attached to the base 202, the disk or disks 208 may then be mounted to the spindle motor 210 and the head stack assembly may then be pivotally coupled to the base 202.

Alternatively, according to another embodiment of the present method, the base 202 and the cover 206 may be separately provided and a hinge 204 may be molded (by an insert molding process, for example) onto the base 202 and the cover 206 to mechanically couple the base 202 to the cover 206 such that the hinge 204 forms a portion of an exterior surface of the enclosure 220. The spindle motor 210 may then be attached to the base 202, the disk or disks 208 may then be mounted to the spindle motor 210 and the head stack assembly may then be pivotally coupled to the base 202. Such an embodiment enables the base 202 and the cover 206 to be separately manufactured to exhibit any desirable characteristic while maintaining the previously addressed advantages inherent in a molded integral hinge. Any desirable combination of such above-detailed methods and structures may be implemented within the context of the present invention. For example, the plastic material of the base 202 and/or the cover 206 may include a glass material, to lend additional rigidity and shielding properties to the enclosure 220. Various structural features may be insert molded into the base 202 and/or the cover 206. Structural features requiring greater rigidity may be formed of a more rigid material, while other features may be formed of a relatively less rigid material. The base 202, the cover 206 and the hinge 204 may be molded together or separately. Other modifications will occur to those of skill in this art and all such modifications are deemed to fall within the scope of the present invention.

What is claimed is:

1. A method of manufacturing a disk drive, comprising:
providing a base;
providing a cover;
molding a hinge formed of a flexible material onto an exterior surface of the base and onto an exterior surface of the cover to mechanically couple the base to the cover such that the hinge forms a portion of an exterior surface of an enclosure defined by the base, the cover, and the hinge;
attaching a spindle motor to the base;
mounting a disk to the spindle motor, and
coupling a head stack assembly pivotally to the base.

2. The method of claim 1, wherein the molding step is an insert-molding step.

3. The method of claim 1, wherein the exterior surfaces on which the hinge is molded comprise a side of the cover and a side of the base, wherein the sides of the cover and the base are adjacent in the enclosure.

4. The method of claim 3, wherein the hinge extends continuously along substantially an entire length of the sides.

5. The method of claim 1, wherein the base and the cover are formed of a plastic that includes a non-plastic filler that is a conductive material or has an electro-magnetic shielding characteristic.

* * * * *